(12) United States Patent
Boddam

(10) Patent No.: US 11,088,914 B2
(45) Date of Patent: Aug. 10, 2021

(54) MIGRATING A MONOLITHIC SOFTWARE APPLICATION TO A MICROSERVICES ARCHITECTURE

(71) Applicant: T-Mobile USA, Inc., Bellevue, WA (US)

(72) Inventor: Linga Reddy Boddam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/527,553

(22) Filed: Jul. 31, 2019

(65) Prior Publication Data

US 2021/0036925 A1 Feb. 4, 2021

(51) Int. Cl.
*G06F 13/00* (2006.01)
*H04L 12/24* (2006.01)

(52) U.S. Cl.
CPC ...... *H04L 41/0893* (2013.01); *H04L 41/0286* (2013.01); *H04L 41/0886* (2013.01); *H04L 41/5054* (2013.01)

(58) Field of Classification Search
CPC ............. H04L 41/0893; H04L 41/5054; H04L 41/0286; H04L 41/0886; H04L 67/148; H04L 29/08639
USPC ................................ 709/238–244, 220–222
See application file for complete search history.

(56) References Cited

U.S. PATENT DOCUMENTS

| | | | |
|---|---|---|---|
| 10,193,992 B2* | 1/2019 | Wagenknecht | G06F 9/542 |
| 10,521,284 B2* | 12/2019 | McClory | G06F 9/5027 |
| 2018/0278705 A1* | 9/2018 | Wagenknecht | H04L 67/141 |
| 2018/0321993 A1* | 11/2018 | McClory | H04L 41/5041 |
| 2019/0260844 A1* | 8/2019 | Wagenknecht | G06F 9/546 |
| 2019/0394285 A1* | 12/2019 | Kalaimalai | H04L 67/16 |

* cited by examiner

*Primary Examiner* — Kenneth R Coulter
(74) *Attorney, Agent, or Firm* — Lee & Hayes, P.C.

(57) ABSTRACT

A network-based services may be supported by a single, monolithic application that is responsible for responding to many different types of requests. The monolithic application may be replaced with multiple microservices that correspond respectively to multiple operations supported by the monolithic application. Each microservice is designed to honor the same application programming interface (API) contract that the monolithic application uses for the corresponding operation. Migration to a microservices-based architecture can be performed gradually, over time, by appropriately configuring a number of API gateways to redirect certain requests, for certain operations, to appropriate microservices. For each operation and corresponding microservice, the number of APIs configured in this manner can be increased until all requests for the operation are being directed to a corresponding microservice. In addition, microservices corresponding to different operations can be introduced over time, again by appropriate configuration of the API gateways.

20 Claims, 3 Drawing Sheets

MIGRATING A MONOLITHIC SOFTWARE APPLICATION TO A MICROSERVICES ARCHITECTURE

BACKGROUND

Businesses often provide web-based services to customers, clients, and/or employees. For example, a business with retail outlets may provide an Internet-accessible service allowing employees at those outlets to access information about products, accounts, and orders.

A network-accessible service such as this may be configured to receive and respond to requests that are formatted using a standardized protocol such as Simple Object Access Protocol (SOAP). Client devices and/or applications provide functionality by sending SOAP requests to the network-accessible service and by receiving SOAP responses.

The network-accessible service may be implemented by a monolithic software application that supports requests for multiple different operations. The operations supported by the service may be described by one or more Web services Description Language (WSDL) files. For each operation, a WSDL file describes the data expected by the software application and the data that will be returned by the software application.

Over time, the monolithic application may become large, complex, and difficult to maintain and enhance. In addition, increasing loads may necessitate additional servers. However, adding servers is typically a manual process of installing and configuring computer hardware, and in some situations may take a significant amount of time and effort. Accordingly, some businesses may wish to migrate to a different type of system that is easier to support and expand.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
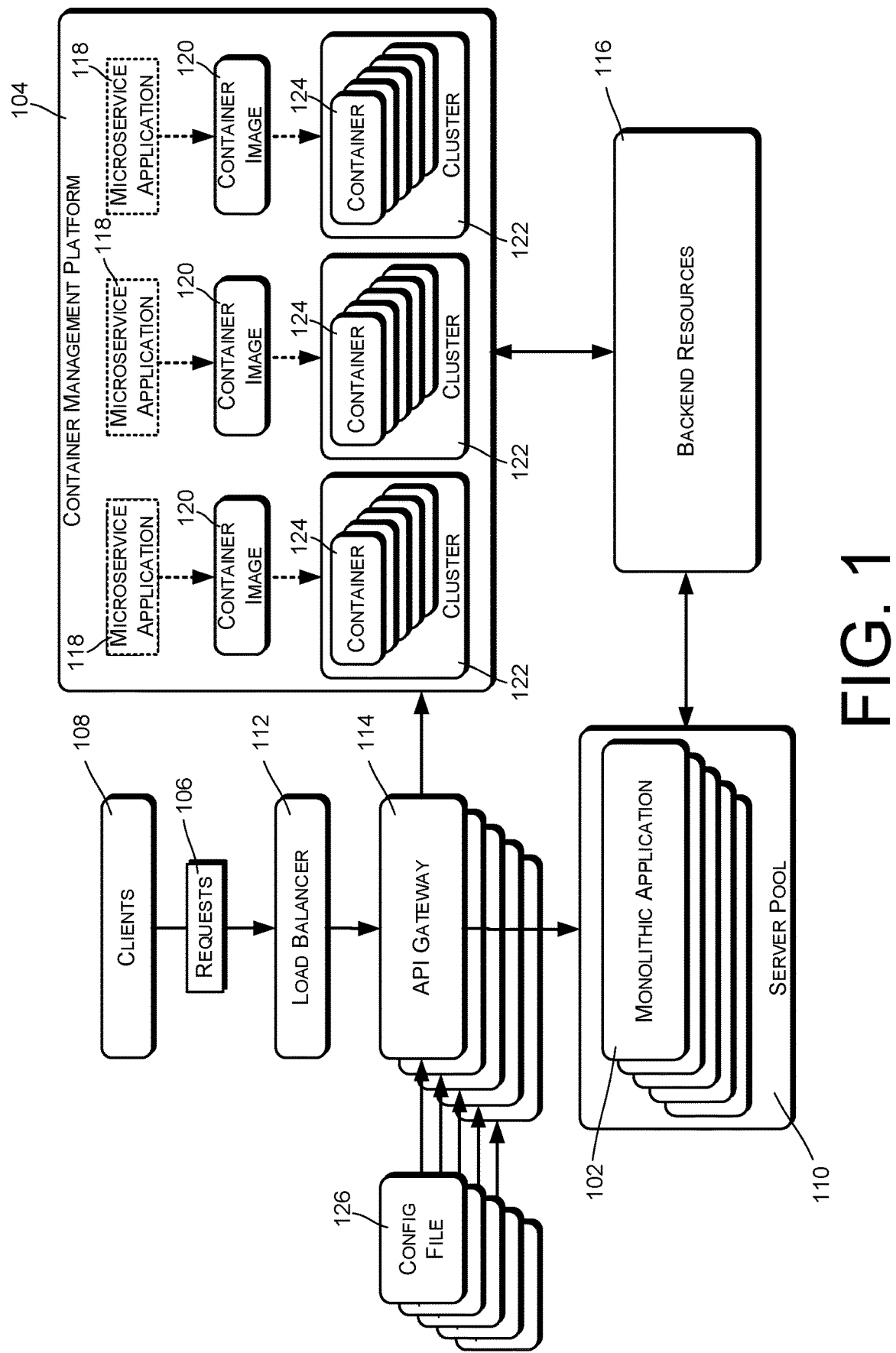
FIG. 1 is a block diagram illustrating components of a computing system that are relevant to migrating from a monolithic application to a microservices architecture.

This disclosure describes, in part, techniques for migrating from a monolithic application that supports multiple operations to an architecture in which the same operations are performed by respectively corresponding microservices. In embodiments described herein, the microservices are implemented using container-based technologies that automatically scale in response to demand.

A network-based service can be implemented using a monolithic application. A monolithic application is one that supports requests for many different operations. In many environments, a system will have multiple instances of the monolithic application, running on respective servers.

Application programming interface (API) gateways may be used to provide a single point of entry for incoming network requests before the requests are routed to the monolithic application. The API gateways perform several functions, including monitoring, authentication, load balancing, and so forth. In addition, the API gateways may be configured to direct received requests to appropriate endpoints for processing. When used in conjunction with a monolithic application, an API gateway directs each request to one of possibly many server computers, each of which executes an instance of the monolithic application. Each instance of the monolithic application is able to respond to requests for any or all of a large number of operations.

Over time, a business may outgrow a monolithic application due to increased business and transaction volume. In addition, continued modification of the monolithic application to support more and more operations may cause the monolithic application to become large and complex, which may in turn increase the difficulty of maintaining and further expanding the application.

In accordance with embodiments described herein, functionality of the monolithic application is gradually moved to multiple microservices, implemented as containers within a container-based platform, in a manner that minimizes risk of downtime and that is transparent to clients of the application. During the migration, which may happen over days, months, or even years, clients can continue to operate without interruption and without changes in communications or communication protocols.

A single operation is initially selected for migration. A microservice application is written to perform the same operation or operations. The microservice application is designed to preserve the same API contract as the monolithic application so that client requests will be handled in the same way as they have been handled by the monolithic application.

The microservice application is containerized by creating a container image. The container image comprises the runtime components of the microservice application such as code files, libraries, environment variables, and any other dependencies. A container management platform uses the container image to create multiple instances of the microservice application, referred to in this environment as containers, that are executed in parallel. The container management platform creates and destroys containers dynamically and automatically, in response to demand.

When introducing a new microservice corresponding to an operation that had previously been processed by the monolithic application, one of the multiple API gateways is reconfigured to direct requests for that operation to a container that has been created based on the microservice application. Over time, more and more of the multiple API gateways are reconfigured in this way to direct more and more of the requests for the operation to the container or to additional instances of the container. As more and more requests are directed to the containers, the container management platform creates more and more containers to process the requests.

At some later time, one or more additional operations may be selected for migration, and the same process may be used for those operations.

The described techniques allow gradual, incremental migration of different operations that were previously provided by the monolithic application. In addition, migration can be performed gradually for each operation by reconfiguring the API gateways in a succession over time, so that over time more and more of the requests for the operation are directed to a corresponding microservice.

The described techniques provide a convenient and easily implementable way to gradually shift a network service workload from a legacy infrastructure, based on a monolithic application that supports multiple operations, to a container-based infrastructure in which operations are supported by respective microservices. The microservice architecture simplifies application support, trouble-shooting and development. The gradual migration improves the reliability of a system during the migration. The automatic scaling provided by the container-based infrastructure allows a service to reliably adapt to increasing demand, in a way that is much more efficient than adding physical server computers.

The described techniques may be useful when testing, for example, without committing to a full transfer of responsibilities from a legacy system to a new microservices-based system. In addition, the techniques allow developers to redirect a specific percentage of incoming requests to a particular microservice, by reconfiguring the same percentage of the API gateways.

FIG. 1 illustrates an example embodiment for migrating a monolithic application 102 to a container management platform 104. The monolithic application 102 is configured to receive and respond to requests 106 for multiple operations. The operations supported by the monolithic application 102 are referred to herein as supported operations. The monolithic application 102 may comprise existing software, sometimes referred to as legacy software, that has been created and deployed to respond to requests for the supported operations.

The requests 106 are received from clients 108. The clients 108 may comprise multiple different front-end systems, such as systems that interact with customers, employees, operators, technicians, etc. For example, the clients 108 may include a network application used by sales representatives to obtain and provide information regarding customer accounts. Other types of network services that may be supported as clients by the monolithic application 102 may include, as examples, an email service, an accounting service, a commerce service, a communication service, etc.

The clients 108 may also, or alternatively, include computer devices (e.g., desktop computers, laptops, tablets, smartphones, etc.) and accompanying software that are used by employees or customers of a business to access and/or utilize the supported operations.

The monolithic application 102 may be implemented by multiple computer servers of a server pool 110, where each computer server of the server pool 110 runs an instance of the monolithic application 102. The computer servers may in some cases be part of a server farm in which multiple physical application servers, each with its own operating system, are configured to simultaneously execute the monolithic application 102.

In some cases, the computer servers of the server pool 110 may support virtualization. That is, each computer server may be configured to instantiate multiple virtual machines, each of which is then configured to execute the monolithic application 102.

Network requests 106 are sent from the clients 108 and are received by a load balancer 112. The load balancer 112 distributes the received requests evenly across multiple application programming interface (API) gateways 114. Each API gateway 114 in turn distributes received requests to an instance of the monolithic application 102.

The API gateways 114 may also perform functions such as authorization, monitoring, etc. As will be further described below, the API gateways 114 may be configured to route requests for different operations to respective endpoints.

In some implementations, the load balancer 112, API gateways 114, and the server pool 110 may be collocated, such as within a room, building, or data center. In other implementations, the server pool 110 may include servers at multiple physical locations.

Upon receiving a network request 106 for an operation, an instance of the monolithic application 102 performs the requested operation and returns any requested or resulting information to the requesting client 108. In the course of performing the operation, the monolithic application 102 may communicate with various backend resources 116. For example, the backend resources 116 may include systems that support services such as billing, account management, sale and lease management, cellular configuration for customer accounts, etc.

The client requests 106 are typically received via the public Internet. However, the server pool 110 and monolithic application 102 may alternatively be configured to provide private or in-house services, and in this case the client requests 106 may be received over a private network or a private portion of a network. Client requests in some cases may be received via encrypted communication tunnels that are implemented through the Internet. Encrypted communication tunnels such as this may be referred to as Virtual Private Networks (VPNs).

When the server pool 110 and the monolithic application 102 are used to support a network service, the demand for that network service may increase over time. That is, the number of network requests 106 received from the clients 108, or the rate at which the requests 106 are received, may increase over time. In response to increasing demand such as this, additional computer servers may be added to the server pool 110. Any added computer server is configured to run the monolithic application 102 and is then connected to a common communication network with the other computer servers of the server pool 110.

In the setting of FIG. 1, it is desired to gradually move the functionality of the monolithic application 102 to a collection of microservices that have been implemented as containers on the container management platform 104. A microservice will be provided for each of the supported operations, and each microservice will be used in place of the monolithic application to respond to requests for a respective supported operation.

The container management platform 104 comprises a computer service, which may be implemented by one or more computers, that automates the creation, removal, execution, and scaling of containers. The container management platform 104 may also be referred to as a container orchestration engine. As an example, "Kubernetes" is popular open source container management platform that is offered by various cloud services and that may also be implemented using in-house hardware.

A "container" in this environment is a self-contained unit of code and data that has been deployed for operation under a computer operating system. A cluster of multiple containers can be executed on a single computer and under a single operating system. An executing container shares operating system resources, such as processor resources and memory resources, with multiple other containers. Thus, a single physical or virtual computer and its operating system can run multiple containers.

In the illustrated embodiment, a microservice application 118 has been designed and provided for each of the supported operations that were previously performed by the monolithic application 102. Each microservice application 118 is a complete application designed to respond to a request for a single operation or a limited set of operations.

In some embodiments, requests and operations supported by the monolithic application 102 may be defined by an API contract, which may in turn be specified in a data structure such as a web services description language (WSDL) document, an extensible markup language (XML) schema, or any of various different data formats that may be used for this purpose. The microservice applications 118 are designed to operate using the same API contracts, corresponding to the supported operations, as the monolithic application 102.

In embodiments in which the monolithic application uses WSDL for a API contracts, each of the multiple supported operations may have a request message format and/or a response message format that are specified in a WSDL file associated with the monolithic application 102.

Each microservice application 118 is containerized to create a corresponding container image 120. The container image 120 comprises the runtime components of the microservice application 118 such as code files, libraries, environment variables, and any other dependencies.

From each container image 120, the container management platform 104 creates a corresponding cluster 122 of one or more containers 124. The containers of a single cluster 122 are created from or based on a corresponding microservice application 118 and container image 120. The containers 124 of a single cluster are configured to receive and respond to requests for a particular operation or to a limited set of operations. Collectively, the containers 124 of a single cluster 122 embody what is referred to as a microservice, where the microservice is responsible for a respective supported operation. The container management platform 104 is configured to maintain multiple container clusters 122, each embodying a microservice, where each microservice responds to requests for a different operation or a limited set of operations. The container management platform 104 automatically, without human intervention, creates and removes containers 124 of the clusters 122 in response to current demand for the operations respectively supported by the clusters 122.

Although three microservices are illustrated in FIG. 1 for purposes of illustration, actual implementations of the described techniques may include any number of microservices that correspond respectively to any number of supported operations.

Each API gateway 114 is associated with a respective configuration file 126, or other mechanism, which is used to direct the routing of received requests 106. Specifically, for each supported operation, the configuration file 126 specifies a respective endpoint to which requests should be directed for processing. Using this mechanism, it is possible to direct requests for some operations to the appropriate cluster 122 of the container management platform 104, while requests for other operations are directed to the monolithic application 102. Furthermore, the API gateways 114 can be configured individually, so that some of the gateways 114 direct requests for a particular operation to the appropriate cluster 122 of the container management platform 104 while other gateways 114 continue to direct requests for the operation to the monolithic application 102.

In embodiments in which the requests 106 specify a client identifier, an API gateway 114 may direct requests of a particular client 108, for a particular operation, to an appropriate cluster 122 of the container management platform 104 while requests of other clients 108 for the same operation may be directed to the monolithic application 102.

Communications between the clients 108, the load balancer 112, the API gateways 114, the monolithic application 102, and the container management platform 104 may use a local area network (LAN), a wide-area network (WAN) such as the Internet, or any other type of data communication capabilities, including wireless communication capabilities. The communications may use any of various types of standardized communication protocols and interfaces. For example, the monolithic application 102 may be configured to support Representational State Transfer (REST) APIs. As another example, the monolithic application 102 may be configured to support Simple Object Access Protocol (SOAP) APIs.

Figure 2:
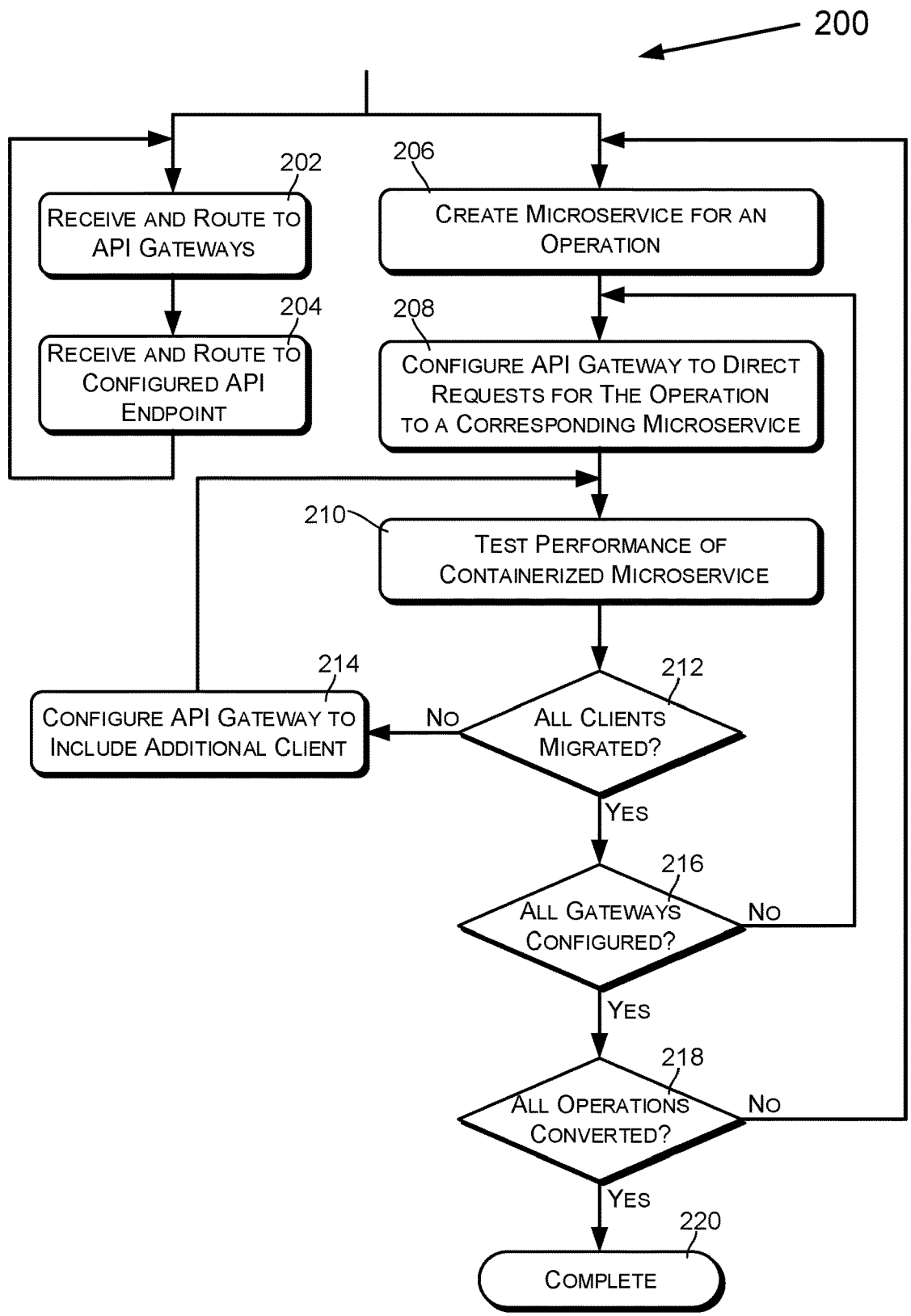
FIG. 2 is a flow diagram illustrating an example method of migrating from a monolithic application to a microservices architecture.

FIG. 2 illustrates an example method 200 for migrating a network service from a monolithic application to a microservices architecture, supported by a container-based runtime platform such as the container management platform 104. The method 200 will be described in the context discussed above with reference to FIG. 1, although the method 200 may also be used with other systems and configurations to replace a monolithic, network-accessible software application with multiple microservices.

An action 202, performed in the described embodiment by the load balancer 112, comprises receiving the incoming requests 106. The requests 106 are for any of multiple operations supported by the monolithic application 102. The action 202 further comprises routing each of the incoming requests 106 to one of the API gateways 114. The load balancer 112 is configured to distribute the requests 106 evenly among the API gateways 114 so that each of the API gateways 114 receives requests at approximately the same rate.

An action 204, performed in the described embodiment by the API gateways 114, comprises receiving and routing the incoming requests 106 to specified endpoints for processing. Initially, the API gateways 114 are configured to route the received requests 106 to the monolithic application 102. In the embodiment shown in FIG. 1, the API gateways 114 route the requests to the server pool 110.

In the described embodiment, the monolithic application 102 is implemented as multiple instances that run on corresponding servers of the server pool 110. The server pool 110 may have or may be associated with load balancing functionality so that requests are directed approximately evenly among the servers of the server pool 110 and the instances of the monolithic application 102.

Configuration of the API gateways 114 may be through the use of configuration files 126 or other data structures that are associated respectively with the API gateways 114. A configuration file 126 associated with an API gateway 114 specifies endpoints for each of the multiple operations supported by the monolithic application 102.

The actions 202 and 204 are performed repeatedly as new requests 106 are received. The actions 202 and 204 are performed in parallel with the remaining actions of FIG. 2 that are described below.

An action 206 comprises creating or otherwise providing a microservice to respond, in place of the monolithic application 102, to requests for a particular operation. For purposes of this discussion, this microservice will be referred to as the first microservice and the particular operation performed by the first microservice will be referred to as the first operation.

The first operation is one of multiple operations supported by the monolithic application 102. The monolithic application 102 processes requests for the first operation in accordance with an API contract, which may be specified in a data structure such as a WSDL file.

In the described embodiment, the first microservice is implemented as a container cluster 122, referred to here as the first container cluster 122, that has been configured to respond to requests for the first operation in accordance with the same API contract used by the monolithic application 102 to support the first operation. The first container cluster 122 comprises one or more software containers 124 that are managed by the container management platform 104. Each container 124 of the first container cluster 122 is based on a microservice application 118, referred to here as the first microservice application 118, that has been designed to perform the first operation.

The container management platform 104 provides automatic scaling of the containers 124. More specifically, the container management platform 104 automatically, without human intervention, creates and destroys containers 124 of a cluster 122 in response to the rate at which requests for the first operation are received by the cluster 122.

An action 208 comprises altering configuration data of an application programming interface (API) gateway of the multiple API gateways 114, referred to here as the first API gateway 114, to specify that at least some of the requests for the first operation are to be routed to the first microservice rather than to the monolithic application. In the described embodiment, the action 208 may comprise altering configuration data of the first API gateway 114, such as altering the configuration file 126 associated with the first API gateway 114, to specify that requests for the first operation are to be routed to a given cluster 122 that implements the first microservice, rather than to the monolithic application 102. More specifically, configuring the first API gateway 114 may comprise specifying the first container cluster 122 as a network endpoint for at least some of the requests for the first operation.

In some embodiments, the action 208 may comprise altering the configuration data of the first API gateway 114 to specify that only requests for the first operation that are received from a specified one or more of the clients 108 are to be routed to the first microservice. For example, each request may include a client identifier, and only requests having a specified client identifier are routed to the first microservice.

The action 208, as well as the other actions of FIG. 2, may be performed while the multiple API gateways 114 continue to receive and route the requests 106. Thus, the action 208 does not cause any interruption of service.

An action 210 comprises testing the first microservice to confirm that it correctly performs the first operation and that it scales appropriately in response to increased request rates. Note that testing and/or observation may be performed at various places in the method 200.

An action 212 comprises determining whether all of the clients 108 have been moved over to the first microservice, for the first operation. More specifically, the action 212 comprises determining whether the first API gateway 114 has been configured to send all requests for the first operation, from all of the clients 108, to the first microservice. If the API gateway 114 is not currently configured to forward all requests for the first operation to the first microservice, an action 214 is performed of further configuring the first API gateway 114 to include one or more additional clients and to direct requests from the additional clients for the first operation to the first microservice. The testing action 210 is then repeated for the one or more additional clients. The actions 210 and 212 are repeated until the first API gateway has been configured to send all requests for the first operation, from all clients, to the first microservice. Each repetition may follow the last repetition by a time period that allows testing and observation, such as an hour, a day, a month, etc.

If the first API gateway has already been configured to send all requests for the first operation to the first microservice, regardless of client origin, an action 216 is performed. The action 216 comprises determining whether the action 208 has been performed for all of the multiple API gateways 114. More specifically, the action 216 comprises determining whether all of the multiple API gateways 114 have been configured to forward requests for the first operation to the first microservice.

If not all of the multiple API gateways 114 have been configured to forward requests for the first operation to the first microservice, the action 208 and subsequent actions of FIG. 2 are repeated for a second API gateway 114. The actions 208, 210, 212, and 214 are repeated until all of the API gateways 114 have been configured to forward requests for the first operation to the first microservice. Each repetition may follow the last repetition by a time period that allows testing and observation, such as an hour, a day, a month, etc.

If all of the API gateways 114 have been configured to forward requests for the first operation to the first microservice, an action 218 is performed of determining whether the preceding actions have been completed for all of the multiple operations supported by the monolithic application 102. More specifically, the action 218 comprises determining whether the multiple API gateways 114 have been configured to forward requests to a microservice, rather than to the monolithic application 102, for all operations supported by the monolithic application 102. If so, the migration is complete, as indicated by the completion block 220.

If the API gateways 114 have not been reconfigured for all of the supported operations, the method 200 is repeated, starting at the action 206, for a second operation and corresponding second microservice. That is, the method 200 repeats, starting at the action 206 until microservices have been created and implemented for all of the supported operations and until all of the API gateways 114 have been reconfigured so that all requests, for all operations and all clients, are being forwarded to an appropriate one of the container clusters 122. Each repetition may follow the last repetition by a time period that allows testing and observation, such as an hour, a day, a month, etc.

Generally, the example method 200 may be performed over a time period such as an hour, a day, a month, or any other time period that allows testing and/or observation after each API gateway is configured (i.e., after the actions 210 and 214). For example, the action 208 may comprise successively configuring, over a time period, individual ones of the multiple API gateways 114 to route at least some of the requests for a given operation to a corresponding microservice rather than to the monolithic network-accessible application. Similarly, the action 214 may comprise successively configuring individual ones of the multiple API gateways 114 to route requests that are from a specified client, for a given operation, are to be routed to the corresponding microservice rather than to the monolithic application 102.

As a more specific example, a first API gateway 114 may be configured at a first time to route requests for an operation to a corresponding microservice. At a second time, which is later than the first time by a time period such as an hour, a day, a month, etc., a second API gateway 114 may be configured similarly to route requests for the operation to the corresponding microservice. This may be continued with a third API gateway 114, and so on.

Similarly, API gateways may be configured at a first time to route requests for a first operation to the corresponding microservice. At a second time, which is later than the first time by a time period such as an hour, a day, a month, etc., the API gateways may be configured to route requests for a second operation to its corresponding microservice. This may then be continued with a third operation and corresponding microservice, and so on.

Generally, the actions of FIG. 2 may be performed at a rate that allows sufficient time for testing and for the container management platform 104 to adapt to added workloads.

The sequences above may be performed in different ways, in different orders, and in various different time sequences. For example, requests for a first operation may be moved gradually (by successively configuring API gateways) to a microservice during a first time period while requests for a second operation are moved gradually to a second microservice during a second time period. The first and second time periods may occur one after the other. Alternatively, the second time period may follow the first time period by at least an hour, a day, a month, a year, etc. As another alternative, the first and second time periods may overlap.

Figure 3:
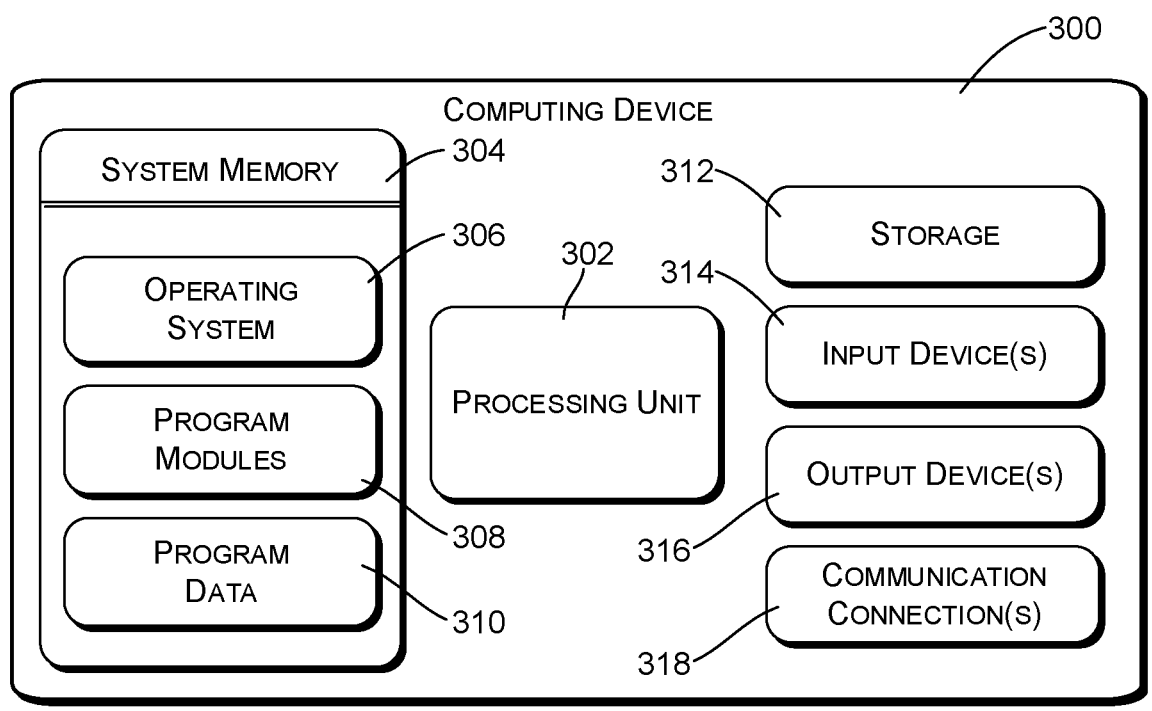
FIG. 3 is a block diagram of an example computing device that may be configured in accordance with the described techniques.

FIG. 3 is a block diagram of an illustrative computing device 300 such as may be used to implement various of the components described above. Generally, one or more computing devices 300 may be used to implement any of the components and/or functionality of FIG. 1, such as servers of the server pool 110 and the clients 108. One or more computing devices 300 may also be used to implement the container management platform 104.

In various embodiments, the computing device 300 may include at least one processing unit 302 and system memory 304. Depending on the exact configuration and type of computing device, the system memory 304 may be volatile (such as RAM), nonvolatile (such as ROM, flash memory, etc.) or some combination of the two. The system memory 304 may include an operating system 306, one or more program modules 308, and may include program data 310.

The computing device 300 may also include additional data storage devices (removable and/or non-removable) such as, for example, magnetic disks, optical disks, or tape. Such additional storage devices are illustrated in FIG. 3 as storage 312.

Non-transitory computer storage media of the computing device 300 may include volatile and nonvolatile, removable and non-removable media, implemented in any method or technology for storage of information, such as computer readable instructions, data structures, program modules, or other data. The system memory 304 and storage 312 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 300. Any such non-transitory computer-readable storage media may be part of the computing device 300.

In various embodiments, any or all of the system memory 304 and storage 312 may store programming instructions which, when executed, implement some or all of the function functionality described above. For example, the system memory and/or storage memory 312 may store software that performs container management for implementation of the container management platform 104. As another example, the system memory and/or storage memory may store software the monolithic application 102 or client software used by the clients 108.

The computing device 300 may also have input device(s) 314 such as a keyboard, a mouse, a touch-sensitive display, voice input device, etc. Output device(s) 316 such as a display, speakers, a printer, etc. may also be included. The computing device 300 may also contain communication connections 318 that allow the device to communicate with other computing devices.

What is claimed is:

1. A method of replacing a monolithic network-accessible software application with multiple microservices, the method comprising:
   by multiple application programming interface (API) gateways, receiving requests for operations, wherein the multiple API gateways are initially configured to route the requests to the monolithic network-accessible software application;
   providing a first microservice to respond, in place of the monolithic network-accessible software application, to requests for a first operation of the operations;
   at a first time, altering configuration data of a first API gateway of the multiple API gateways to specify that at least some of the requests for the first operation are to be routed to the first microservice rather than to the monolithic network-accessible software application;
   at a second time that is later than the first time, altering configuration data of a second API gateway to specify that the at least some of the requests for the first operation are to be routed to the first microservice rather than to the monolithic network-accessible software application;
   providing a second microservice to respond, in place of the monolithic network-accessible software application, to requests for a second operation of the operations; and
   at a third time that is later than the second time, altering configuration data of at least one of the multiple API gateways to specify that the requests for the second operation are to be routed to the second microservice rather than to the monolithic network-accessible software application.

2. The method of claim 1, wherein altering the configuration data of the first API gateway comprises altering the configuration data of the first API gateway to specify that requests from a specified client are to be routed to the first microservice rather than to the monolithic network-accessible software application.

3. The method of claim 1, wherein altering the configuration data of the first API gateway comprises specifying the first microservice as a network endpoint for the at least some of the requests for the first operation.

4. The method of claim 1, wherein:
   the first microservice is provided by one or more first software containers that are automatically created and destroyed in response to a rate at which the requests for the first operation are received; and
   the second microservice is provided by one or more second containers that are automatically created and destroyed in response to a rate at which the requests for the second operation are received.

5. The method of claim 1, wherein:
the monolithic network-accessible software application provides a first API contract for the first operation and the first microservice uses the first API contract for the first operation; and
the monolithic network-accessible software application provides a second API contract for the second operation and the second microservice uses the second API contract for the second operation.

6. The method of claim 1, wherein altering the configuration data of the first API gateway, the second API gateway, and the at least one of the multiple API gateways is performed while the multiple API gateways continue to receive the requests.

7. The method of claim 1, wherein:
the second time is later than the first time by at least an hour; and
the third time is later than the second time by at least a day.

8. A method of replacing a monolithic application with multiple microservices, wherein the monolithic application processes requests for a first operation and for a second operation, the method comprising:
receiving incoming requests for operations;
routing each of the incoming requests to one of multiple application programming interface (API) gateways, wherein the multiple API gateways are initially configured to route the incoming requests to the monolithic application;
over a first time period, successively configuring individual ones of the multiple API gateways to route at least some of the requests for the first operation to a corresponding first microservice rather than to the monolithic application; and
over a second time period, successively configuring the individual ones of the multiple API gateways to route at least some of the requests for the second operation to a corresponding second microservice rather than to the monolithic application.

9. The method of claim 8, wherein configuring an individual one of the multiple API gateways comprises altering configuration data of the individual one of the multiple API gateways.

10. The method of claim 8, wherein configuring an individual one of the multiple API gateways comprises specifying the first microservice as a network endpoint for the at least some of the requests for the first operation.

11. The method of claim 8, wherein the first microservice is provided by software containers that are automatically created and destroyed in response to a rate at which the at least some of the requests for the first operation are received.

12. The method of claim 8, wherein successively configuring the individual ones of the multiple API gateways comprises successively configuring the individual ones of the multiple API gateways to route requests that are from a specified client, for the first operation, to the corresponding first microservice rather than to the monolithic application.

13. The method of claim 8, wherein the monolithic application provides a first API contract for the first operation and the first microservice uses the first API contract for the first operation.

14. The method of claim 8, wherein:
the first time period is at least an hour; and
the second time period is at least a day.

15. The method of claim 8, wherein the second time period follows the first time period by at least a day.

16. A method, comprising:
receiving requests for operations;
routing each of the requests to one of multiple application programming interface (API) gateways, wherein the multiple API gateways are initially configured to route the requests to a monolithic application, and wherein (a) the monolithic application processes requests for a first operation in accordance with a first API contract and (b) the monolithic application processes requests for a second operation in accordance with a second API contract;
configuring a first container cluster to respond to the requests for the first operation in accordance with the first API contract;
over a first time period, successively configuring individual ones of the multiple API gateways to route at least some of the requests for the first operation to the first container cluster rather than to the monolithic application;
configuring a second container cluster to respond, in place of the monolithic application, to the requests for the second operation in accordance with the second API contract; and
over a second time period that is later than the first time period, successively configuring the individual ones of the multiple API gateways to route at least some of the requests for the second operation to the second container cluster rather than to the monolithic application.

17. The method of claim 16, wherein:
successively configuring the individual ones of the multiple gateways to route at least some of the requests for the first operation is performed while the multiple API gateways continue to receive the requests; and
successively configuring the individual ones of the multiple gateways to route at least some of the requests for the second operation is performed while the multiple API gateways continue to receive the requests.

18. The method of claim 16, wherein the second period follows the first period.

19. The method of claim 16, wherein the second period overlaps the first period.

20. The method of claim 16, wherein the first time period is at least a day.

* * * * *